Patented Aug. 4, 1936

2,050,208

UNITED STATES PATENT OFFICE 2,050,208

ACCELERATOR OF VULCANIZATION

Howard I. Cramer, Cuyahoga Falls, Ohio, assignor, by mesne assignments, to Wingfoot Corporation, Wilmington, Del., a corporation of Delaware No Drawing. Application June 15, 1932,
Serial No. 617,477

36 Claims. (Cl. 18—53)

My invention relates to accelerators of the vulcanization of rubber. More particularly it concerns that class of accelerators known as substituted ammonium salts of mercapto aromatic thiazoles. I have discovered a new class of these salts; namely, the binary alicyclic ammonium thiazyl mono sulphides, and have found that they art excellent accelerators of the vulcanization of rubber. These compounds may be prepared by the simple expedient of refluxing molar quantities of the desired secondary alicyclic amine with a suspension of the desired mercapto aromatic thiazole in an inert solvent for a suitable period, generally about an hour.

The following are illustrative examples of mercapto aromatic thiazoles which may be employed: 2-mercaptobenzothiazole, 2-mercapto 4-phenyl thiazole, 6-methyl mercaptobenzothiazole, 5 or 6 chloro mercaptobenzothiazole, 6-amino mercaptobenzothiazole, 6-nitro mercaptobenzothiazole, and mercapto xylyl thiazoles. Secondary alicyclic amines with which such mercapto aromatic thiazoles will react may be represented by the type formula

in which R may be alkyl, alicyclic, aryl, or aralkyl, and $R_1$ is any alicyclic group. Examples are methyl cyclohexyl amine, ethyl cyclohexyl amine, isopropyl cyclohexyl amine, butyl cyclohexyl amine, dicyclohexyl amine, cyclohexyl aniline, cyclohexyl benzyl amine, N-methyl tetra hydro alpha or beta naphthylamine, N-ethyl tetra hydro alpha or beta naphthylamine, and N-ethyl alpha or beta decahydro naphthylamine.

In the reaction of these secondary alicyclic amines with the mercapto aromatic thiazoles, the nitrogenation of the amino group is apparently added directly to the sulphur in the mercapto group. For example, the reaction of ethyl cyclohexyl amine with mercaptobenzothiazole may be represented thus:

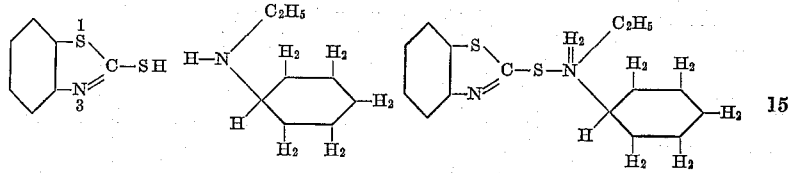

That between methyl cyclohexyl amine and 6-amino mercaptobenzothiazole may be expressed as follows:

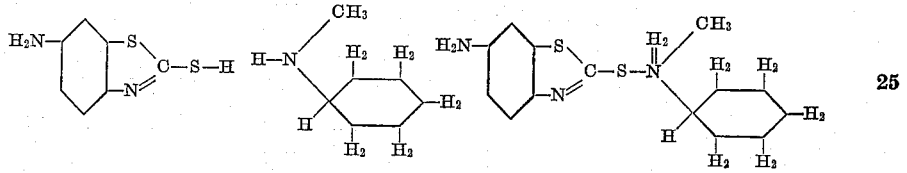

The compounds in question may be prepared by the refluxing of the amine in a suspension of the mercapto aromatic thiazole in an inert solvent. The crude products, although of high purity, may be further purified by recrystallization from alcohol. As a specific illustration, ethyl cyclo hexyl ammonium benzothiazyl mono sulphide is prepared by refluxing 1 mol. of ethyl cyclo hexyl amine with a suspension of 1 mol. of mercaptobenzothiazole in high test gasolene for a period of one hour. The resulting product when recrystallized from alcohol has a melting point of 133 degrees C. and an analysis of nitrogen 8.95% and sulfur 22.05%. The calculated theoretic analysis for ethyl cyclo hexyl ammonium benzothiazyl mono sulphide is nitrogen 9.52% and sulfur 21.78%.

Dicyclohexyl ammonium benzothiazyl mono sulphide is prepared similarly and is a crystalline compound having a melting point of 172 degrees C. and an analysis of nitrogen 7.83% and sulfur 18.65%. The calculated values for the percentages of nitrogen and sulfur in dicyclohexyl ammonium benzothiazyl mono sulphide are 8.05 and 18.39 respectively. The reaction is thought to proceed as follows:

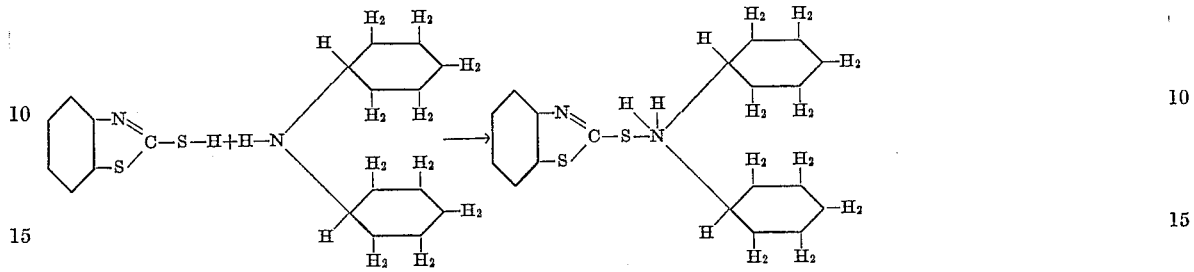

Although the compounds may be employed in most of the standard rubber formulae, the following is an example of one in which they have been found to be effective as accelerators:

| | Parts |
|---|---|
| Rubber | 100.00 |
| Zinc oxide | 5.00 |
| Sulphur | 3.00 |
| Stearic acid | 1.50 |
| Accelerator | 0.50 |

To test the value of these new materials as accelerators, two sets of samples prepared in accordance with the above formula were subjected to vulcanization for varying periods of time. One set of samples was tested for elasticity and tensile strength immediately, while the other set was weighed, aged in an oxygen bomb for six days at a temperature of 50 degrees C. and at a pressure of 150 pounds per square inch, and reweighed in order to ascertain the increase in weight due to absorption of oxygen prior to its testing for elasticity and tensile strength. The results of these tests are shown by the following data:

| Time of cure in mins. at 260° F. | Load in kgs/cm² at | | | Percent elong. at break | Percent weight increase |
|---|---|---|---|---|---|
| | 500% elong. | 700% elong. | Break | | |

*Dicyclohexyl ammonium benzothiazyl mono sulphide*

Original

| 10 | 9 | 22 | 64 | 900 | |
| 15 | 16 | 50 | 131 | 850 | |
| 25 | 21 | 97 | 135 | 795 | |
| 40 | 33 | 132 | 159 | 730 | |

Aged in oxygen bomb

| 10 | 15 | 46 | 101 | 835 | .35 |
| 15 | 19 | 63 | 114 | 800 | .32 |
| 25 | 22 | 80 | 116 | 760 | .31 |
| 40 | 29 | | 69 | 635 | 2.22 |

*Ethyl cyclohexyl ammonium benzothiazyl mono sulphide*

Original

| 3 | 9 | 22 | 44 | 820 | |
| 5 | 11 | 32 | 103 | 910 | |
| 10 | 24 | 80 | 100 | 740 | |
| 15 | 26 | 110 | 176 | 780 | |

Aged in oxygen bomb

| 3 | 14 | 49 | 108 | 830 | .33 |
| 5 | 18 | 65 | 104 | 780 | .30 |
| 10 | 25 | 97 | 160 | 785 | .30 |
| 15 | 27 | 115 | 148 | 740 | .27 |

From this it will be seen that the compounds are powerful accelerators of vulcanization, giving rubber articles of increased tensile strength and elasticity. It is also noted that they give rubber stocks with excellent ageing qualities. Further they are substantially non-toxic, may be readily incorporated in rubber, and are quite simply prepared. It is apparent that I have discovered a new group of highly valuable compounds.

It will be understood that the details of my invention may be varied within comparatively wide limits without departing from the inventive concept and that I therefore desire to embrace within the scope of my invention such modifications and changes as may be necessary to adapt it to varying conditions and uses. It is intended that the patent shall cover by suitable expression in the appended claims whatever features of patentable novelty reside in the invention.

What is claimed is:

1. As new compositions of matter adapted for use in the vulcanization of rubber, compounds of the type formula

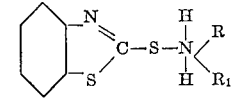

wherein R and R₁ are hydrocarbon groups at least one of which is alicyclic.

2. As a new composition of matter adapted for use in the vulcanization of rubber, ethyl cyclo hexyl ammonium benzothiazyl mono sulphide.

3. As a new composition of matter adapted for use in the vulcanization of rubber, dicyclohexyl ammonium benzothiazyl mono sulphide.

4. The method of preparing mercapto thiazole reaction products of secondary amines in which at least one hydrocarbon group is alicyclic which comprises treating a suspension of the mercaptothiazole in an inert solvent with the amine.

5. The method of preparing mercaptobenzothiazole reaction products of secondary amines in which at least one hydrocarbon group is alicyclic which comprises reacting a suspension of mercaptobenzothiazole in a volatile inert solvent with an equivalent amount of the amine by refluxing the reacting materials.

6. The method of preparing ethyl cyclohexyl ammonium benzothiazyl mono sulphide which comprises refluxing equivalent amounts of mercaptobenzothiazole and ethyl cyclohexyl amine.

7. A method of preparing dicyclohexyl ammonium benzothiazyl mono sulphide which comprises interacting equivalent amounts of dicyclohexyl amine and mercaptobenzothiazole.

8. A method of treating rubber which comprises vulcanizing it in the presence of a compound of the type formula

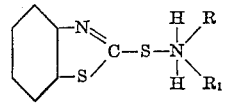

wherein R and R₁ are hydrocarbon groups at least one of which is alicyclic.

9. A method of treating rubber which comprises vulcanizing it in the presence of a binary alicyclic ammonium benzothiazyl mono sulphide.

10. A method of treating rubber which comprises vulcanizing it in the presence of ethyl cyclohexyl ammonium benzothiazyl mono sulphide.

11. A method of treating rubber which comprises vulcanizing it in the presence of dicyclohexyl ammonium benzothiazyl mono sulphide.

12. A rubber stock which has been vulcanized in the presence of ethyl cyclohexyl ammonium benzothiazyl mono sulphide.

13. A rubber stock which has been vulcanized in the presence of dicyclohexyl ammonium benzothiazyl mono sulphide.

14. A rubber stock which has been vulcanized in the presence of a compound of the type formula

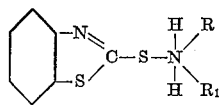

wherein R and R₁ are hydrocarbon groups at least one of which is alicyclic.

15. A rubber stock which has been vulcanized in the presence of a mercaptide derived from the interaction of binary alicyclic ammonium benzothiazyl mono sulphide.

16. As new compositions of matter adapted for use in the vulcanization of rubber, compounds of the type formula

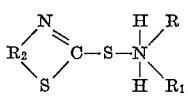

wherein R is a hydrocarbon, R₁ is alicyclic and R₂ is aryl.

17. A method of treating rubber which comprises vulcanizing it in the presence of a compound of the type formula

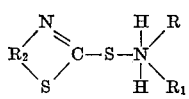

wherein R is a hydrocarbon, R₁ is alicyclic and R₂ is aryl.

18. A rubber stock which has been vulcanized in the presence of a compound of the type formula

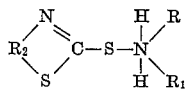

wherein R is a hydrocarbon, R₁ is alicyclic and R₂ is aryl.

19. As new compositions of matter adapted for use in the vulcanization of rubber, compounds of the type formula

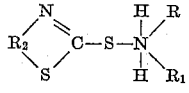

wherein R is an aliphatic hydrocarbon, R₁ is a cyclohexyl radical, and R₂ is aryl.

20. A method of treating rubber which comprises vulcanizing it in the presence of a compound of the type formula

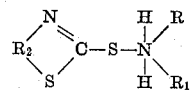

wherein R is an aliphatic hydrocarbon, R₁ is a cyclohexyl radical, and R₂ is aryl.

21. A rubber stock which has been vulcanized in the presence of a compound of the type formula

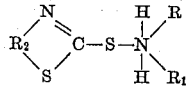

wherein R is an aliphatic hydrocarbon, R₁ is a cyclohexyl radical, and R₂ is aryl.

22. The process of producing vulcanized rubber which comprises heating rubber and sulfur in the presence of a vulcanization accelerator comprising a reaction product of substantially equimolecular proportions of dicyclohexyl amine and mercaptobenzothiazole.

23. The vulcanized rubber product produced by heating rubber and sulfur in the presence of a vulcanization accelerator comprising a reaction product of substantially equi-molecular proportions of dicyclohexyl amine and mercaptobenzothiazole.

24. As new compositions of matter adapted for use in the vulcanization of rubber, the di-alicyclic ammonium aromatic thiazyl mono sulphides.

25. A method of treating rubber which comprises vulcanizing it in the presence of a di-alicyclic ammonium aromatic thiazyl mono sulphide.

26. A rubber stock which has been vulcanized in the presence of a di-alicyclic ammonium aromatic thiazyl mono sulphide.

27. As a new composition of matter adapted for use in the vulcanization of rubber, the reaction product of a mercapto benzenoid thiazole and a secondary amine of the type formula

in which R and R₁ are hydrocarbon groups at least one of which is alicyclic.

28. A method of treating rubber which comprises vulcanizing it in the presence of the reaction product of a mercapto benzenoid thiazole and a secondary amine of the type formula

in which R and R₁ are hydrocarbon groups at least one of which is alicyclic.

29. A rubber stock which has been vulcanized in the presence of a reaction product of a mercapto benzenoid thiazole and a secondary amine of the type formula

in which R and R₁ are hydrocarbon groups at least one of which is alicyclic.

30. As new compositions of matter adapted for use in the vulcanization of rubber, the binary alicyclic ammonium benzothiazyl mono sulphides.

31. As new compositions of matter adapted for use in the vulcanization of rubber, the binary alicyclic ammonium aromatic thiazyl mono sulphides.

32. A method of treating rubber which comprises vulcanizing it in the presence of a binary alicyclic ammonium aromatic thiazyl mono sulphide.

33. A rubber stock which has been vulcanized in the presence of a binary alicyclic ammonium aromatic thiazyl mono sulphide.

34. The process of producing vulcanized rubber which comprises heating rubber and sulphur in the presence of a vulcanization accelerator comprising a reaction product of an alicyclic secondary amine and a mercapto aryl thiazole.

35. The process of producing vulcanized rubber which comprises heating rubber and sulphur in the presence of a vulcanization accelerator comprising a reaction product of N-methyl cyclohexyl amine and a mercapto aryl thiazole.

36. As a new composition of matter adapted for use in the vulcanization of rubber, the N-methyl cyclohexyl amine salt of a mercapto aryl thiazole.

HOWARD I. CRAMER.

CERTIFICATE OF CORRECTION.

Patent No. 2,050,208. August 4, 1936.

HOWARD I. CRAMER.

It is hereby certified that error appears in the printed specification of the above numbered patent requiring correction as follows: Page 1, second column, line 6, for "nitrogenation" read nitrogen atom; page 3, first column, lines 32 and 33, claim 15, strike out the words "mercaptide derived from the interaction of; and that the said Letters Patent should be read with these corrections therein that the same may conform to the record of the case in the Patent Office.

Signed and sealed this 22nd day of September, A. D. 1936.

Henry Van Arsdale (Seal) Acting Commissioner of Patents.